United States Patent
Chen et al.

(10) Patent No.: US 7,564,595 B2
(45) Date of Patent: Jul. 21, 2009

(54) LENS MODULE WITH ADJUSTABLE MAGNIFICATION

(76) Inventors: Tsung-Yin Chen, No. 1, Lane 74, Shimen St., Hsinchu (TW) 300; Chin-Chung Lien, 2Fl., No. 2, Alley 1, Lane 109, Shioufeng Rd., Shijr City, Taipei (TW) 221

( * ) Notice: Subject to any disclaimer, the term of this patent is extended or adjusted under 35 U.S.C. 154(b) by 987 days.

(21) Appl. No.: 10/417,207

(22) Filed: Apr. 17, 2003

(65) Prior Publication Data
US 2003/0227655 A1 Dec. 11, 2003

(30) Foreign Application Priority Data
Jun. 6, 2002 (TW) ................ 91112260 A

(51) Int. Cl.
*H04N 1/04* (2006.01)
(52) U.S. Cl. ............ 358/474; 358/1.9; 348/347; 396/125; 359/819
(58) Field of Classification Search ............. 358/1.9, 358/1.2, 488, 474; 348/347, 345, 354, 208.6; 396/98, 133, 125; 359/819, 822; 250/208.1
See application file for complete search history.

(56) References Cited
U.S. PATENT DOCUMENTS

| | | | | |
|---|---|---|---|---|
| 4,497,573 A * | 2/1985 | Tokuhara et al. | ............. | 355/58 |
| 4,819,018 A * | 4/1989 | Moyroud et al. | ............. | 396/549 |
| 5,264,879 A * | 11/1993 | Shikama | ............. | 353/31 |
| 5,293,538 A * | 3/1994 | Iwata et al. | ............. | 356/239.1 |
| 5,847,822 A * | 12/1998 | Sugiura et al. | ............. | 356/239.2 |
| 5,862,425 A * | 1/1999 | Aoki | ............. | 396/429 |
| 5,864,523 A * | 1/1999 | Yoshizawa | ............. | 369/44.23 |
| 6,307,591 B1 * | 10/2001 | Yoshida et al. | ............. | 348/445 |
| 6,400,442 B1 * | 6/2002 | Johnson et al. | ............. | 355/67 |
| 6,542,178 B2 * | 4/2003 | Miyagawa et al. | ............. | 347/256 |
| 6,731,339 B2 * | 5/2004 | Ohkawara | ............. | 348/347 |
| 6,985,267 B2 * | 1/2006 | Tang et al. | ............. | 358/474 |
| 7,087,892 B2 * | 8/2006 | Yoshikawa et al. | ............. | 250/235 |
| 2001/0045989 A1 * | 11/2001 | Onuki | ............. | 348/345 |
| 2004/0196504 A1 * | 10/2004 | Kono | ............. | 358/300 |

* cited by examiner

*Primary Examiner*—Negussie Worku
(74) *Attorney, Agent, or Firm*—Stolowitz Ford Cowger LLP

(57) ABSTRACT

A lens module with adjustable magnification is installed in a scanner. The lens module can be used to collect and focus a scanning light beam to form an image onto at least one optical sensing device, which may be replaceable. The lens module includes a primary lens and at least one correction lens. The correction lens is with respect to the size of the optical sensing device, such as the total length of the effective pixels, and is installed at a location in front of the light collection end or between the image output end and the optical sensing device. This allows the size of the image focused by lens module to match with the size of the optical sensing device, so that the image can be captured by the optical sensing device.

18 Claims, 4 Drawing Sheets

LENS MODULE WITH ADJUSTABLE MAGNIFICATION

This application claims the benefit of Taiwan application Serial No. 91112260, filed on Jun. 6, 2002.

BACKGROUND OF THE INVENTION

1. Field of the Invention

This invention relates to a lens module, and more particularly, the invention relates to a lens module with adjustable magnification, which can be implemented with a corresponding correction lens and a primary lens by the selection, according to a dimension of the optical sensing device, such as the total length of the effective image pixels.

2. Description of Related Art

In the current modern life with the scientific technology in great and rapid development, the scanner has been an important apparatus in the daily life for the modern people. For example, the user can use the scanner to scan a document or a picture pattern, so as to capture the scanned image for the document or the picture pattern and store it as a backup. The scanned image can be further modified and enhanced if desired. It is very convenient.

In general, the scanner includes a light source, a primary lens, and an optical sensing device. When the scanner scans the document to be scanned, the light source will provide the light beam to illuminate the document and produce a scanning light beam. Next, the primary lens will collect and focus the scanning light beam and to form an image on the optical sensing device. Then, the optical sensing device will capture the scanned image from the document. Also, the size of the scanned image must satisfy the size specifications of the optical sensing device.

Referring to FIG. 1, it is a drawing schematically illustrating an optical path from the document to be scanned through the primary lens, and to the optical sensing device. As shown in FIG. 1, the primary lens 102 has a light collection end 102a and an image output end 102b, which are opposite to each other. The document to be scanned 106 is located at the outer side of the light collection end 102a, and the optical sensing device 104 is located at the outer side of the image output end 102b. In the scanning process, after the light source (not shown in FIG. 1) illuminates the document to be scanned 106, a scanning light beam 108 is produced. The primary lens 102 will collect the scanning light beam 108 via the image output end 102b and focus the light to form an image on the optical sensing device 104 located at the outer side of the image output end 102b. It is noted that the size of the scanned image captured by the optical sensing device 104 satisfies the size of the optical sensing device 104. It is assumed that the size of the document to be scanned 106 is L, and the size of the scanned image captured by the optical sensing device 104 and the size of the optical sensing device are equal to A. In this situation, the magnification of the primary lens 102 is A/L.

Generally, the size of the optical sensing device used by the current scanners is not always the same, which results in the need of an optical sensing device of different size to be implemented correspondingly with a primary lens by different magnification, so as to precisely capture the scanned image. Since this optical sensing device needs to be implemented with a primary lens, the manufacturer must specifically develop a corresponding primary lens to match the optical sensing device being used. This procedure would consume much development resource and increase fabrication cost.

SUMMARY OF THE INVENTION

It is therefore an objective of the present invention to provide a lens module with adjustable magnification, in which the user can correspondingly select a correction lens according to a dimension of the optical sensing device, such as the total length of the effective pixels. As a result, the size of the image formed by focusing the lens module can satisfy the size of the optical sensing device. The image then can be captured by the optical sensing device. Therefore, the present invention can allow the single lens to properly be adapted into the optical sensing device of a different size, so that the labor of developing another primary lens can be saved, and thus, the invention can save the research resource and the fabrication cost.

In accordance with the objectives of the present invention, the invention provides a lens module used to collect and focus a light beam to form an image on at least one optical sensing device. The lens module includes a primary lens and at least one correction lens, in which the correction lens is relative to a size of the optical sensing device and is implemented at one outer side of the primary lens or between one end of the primary lens and the optical sensing device. The light beam is focused to form an image on the optical sensing device via the correction lens and the primary lens. The size of the image formed by the focusing from the lens module is matched to the size of the optical sensing device. As a result, the image can be captured by the optical sensing device.

In accordance with another objective of the present invention, a scanner having the lens module with adjustable magnification is further provided, so as to scan a document to be scanned and to produce a scanning light beam in the process. The scanner includes at least one optical sensing device and a lens module, wherein the optical sensing device can be replaceable inside the scanner, and the lens module is used to collect and focus the scanning light beam to form an image on the optical sensing device. Also, the size of the image formed by the focusing of the lens module is matched to the size of the optical sensing device, so that the image can be captured by the optical sensing device. The lens module includes a primary lens and at least one correction lens, in which the primary lens relatively has a light collecting end and an image output end. Furthermore, the correction lens is relative to a size of the optical sensing device and is implemented at front side of the light collection end or located between image output end and the optical sensing device. This causes the lens module to have a magnification larger or smaller than the magnification of the primary lens. The scanning light beam is focused to form an image on the optical sensing device via the correction lens and the primary lens.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The present invention particularly designs a lens module with adjustable magnification, which is installed in a scanner. The lens module can be used to collect a scanning light beam, which is produced after the scanner scans a document to be scanned, and then to focus the light beam to form an image onto at least one optical sensing device, which may be replaceable. The lens module includes a primary lens and at least one correction lens, wherein the primary lens relatively has a light collection end and an image output end. The correction lens is with respect to the size of the optical sensing device, such as the total length of the effective pixels, and is installed at a location in front of the light collection end or between the image output end and the optical sensing device. This allows the lens module to have a magnification larger or smaller than the magnification of the primary lens. The scanning light beam is focused to form an image on the optical sensing device via the correction lens and the primary lens. Also, the size of the image being focused by the lens module is matched to the size of the optical sensing device, so that the image can be captured by the optical sensing device.

As a result, when the user installs the optical sensing device of different size into the scanner, the user only needs to install the lens module of the present invention and to change the correction lens correspondingly. Therefore, it is not necessary to install another corresponding primary lens or develop a new primary lens. The present invention can achieve savings in the research resource and the fabrication cost.

As to the lens module with adjustable magnification of the present invention, the practical applications with a first preferred embodiment and a second preferred embodiment are described in the following examples.

Embodiment 1

Figure 1:
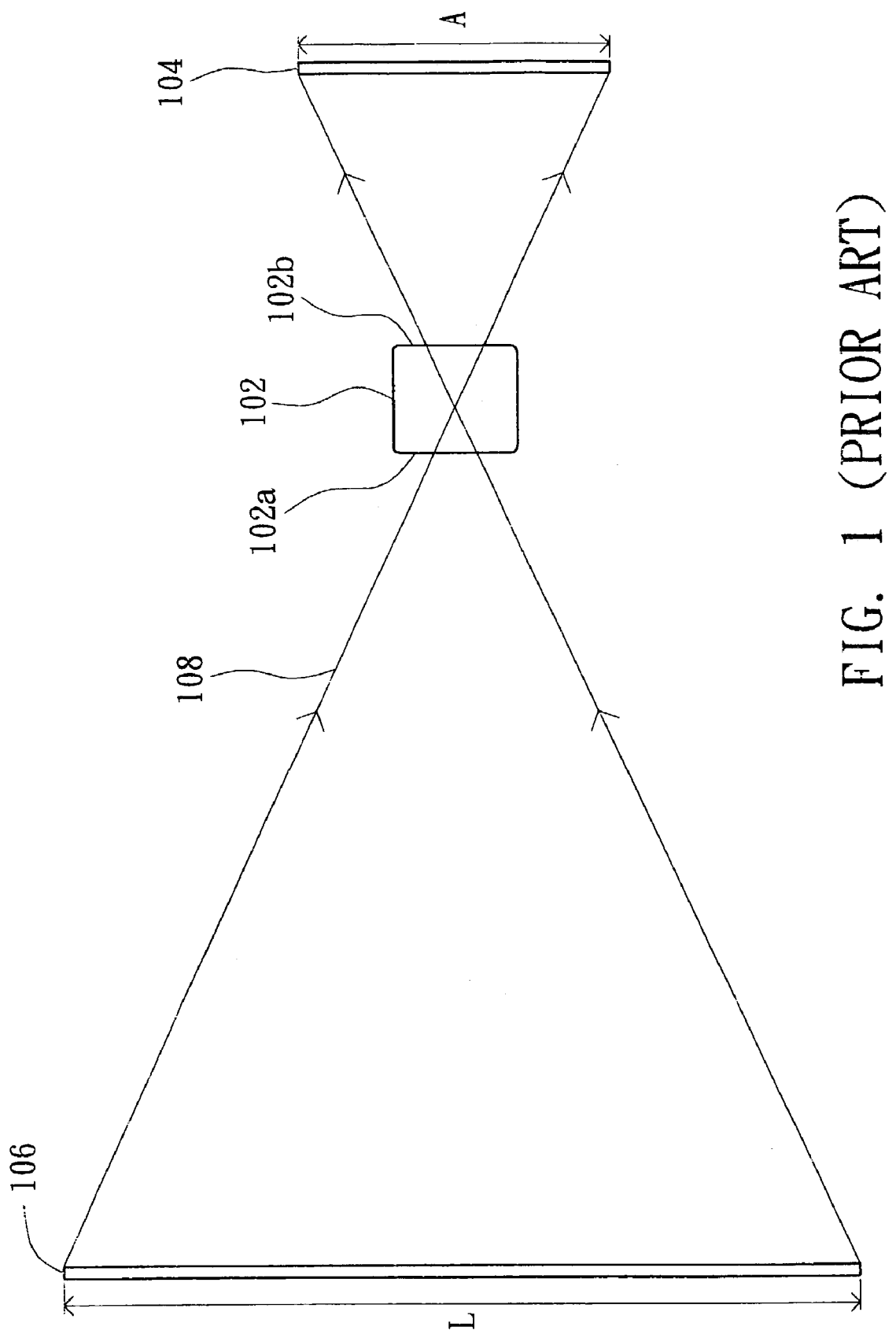
FIG. 1 is a drawing schematically illustrating a conventional optical path among the document to be scanned, the primary lens, and the optical sensing device.
Figure 2:
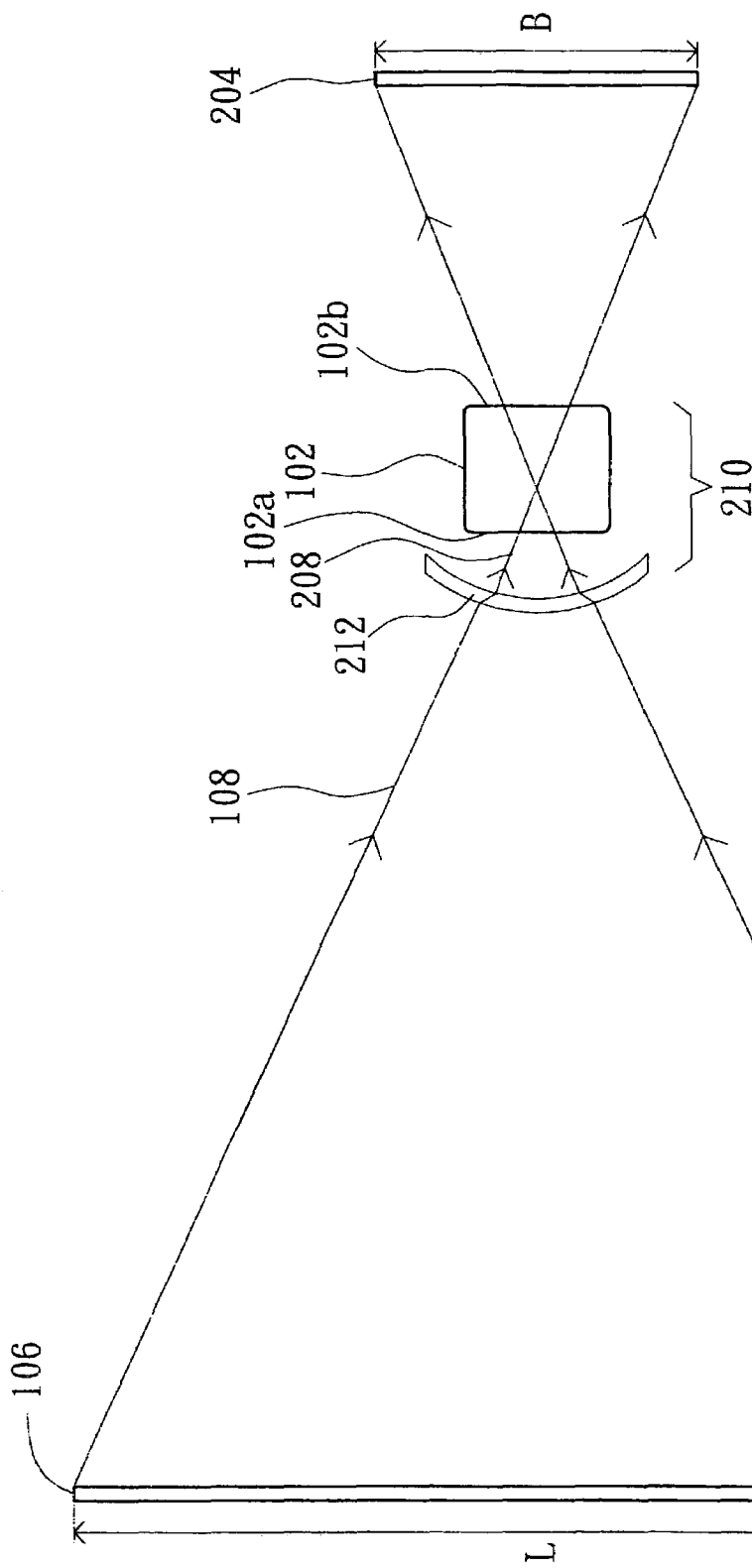
FIG. 2 is a drawing schematically illustrating an optical path among the document to be scanned, the primary lens, and the optical sensing device, according to a first preferred embodiment of the present invention.

Referring to FIG. 2, it is a drawing schematically illustrating an optical path among the document to be scanned, the primary lens, and the optical sensing device, according to a first preferred embodiment of the present invention. Referring to FIG. 1 and FIG. 2 at the same time, when the optical sensing device 104 of FIG. 1 is replaced by the optical sensing device 204 of FIG. 2 having a smaller size, the user then can install the lens module 210 of the present invention, so as to collect and focus the light scanning beam 108 to form an image onto the optical sensing device 204. The optical sensing device 104 shown in FIG. 1 has the size of A and the optical sensing device 204 has the size of B, where the quantity of B is less than the quantity of A.

Therefore, the user can directly install a correction lens 212 at the location in front of the light collection end 102a of the primary lens 102, such as a convergent lens for converging the light in order to change the original optical path for the original scanning light beam 108 (as shown in FIG. 1). This allows the scanning light beam 108 passing through the correction lens 212 to have the light converging effect, and thus a lens corrected light beam 208 is obtained. Then, the primary lens 102 will collect and focus the lens corrected light beam 208 to form an image onto the optical sensing device 204. Next, the optical sensing device 204 captures the scanning image of the document to be scanned 106. Also, the size of the scanning image is matched to the size of the optical sensing device 204.

Assuming the size of the scanning image captured by the optical sensing device 204 is B, then the magnification of the lens module 210 is B/L. Since the quantity of B is less than the quantity of A, the quantity of B/L is also less than the quantity A/L, and accordingly, the magnification of the lens module 210 is less than the magnification of the primary lens 102.

Therefore, when the user wants to change to an optical sensing device of smaller size, the user can directly install a correction lens with the effect of converging the light beam, i.e. a convergent lens located in front of the light collection end of the original primary lens or between the image output end of the original primary lens and the optical sensing device. In this manner, the objective can be achieved that the size of the scanned image captured by the optical sensing device can match to the size of the optical sensing device.

Embodiment 2

Figure 3:
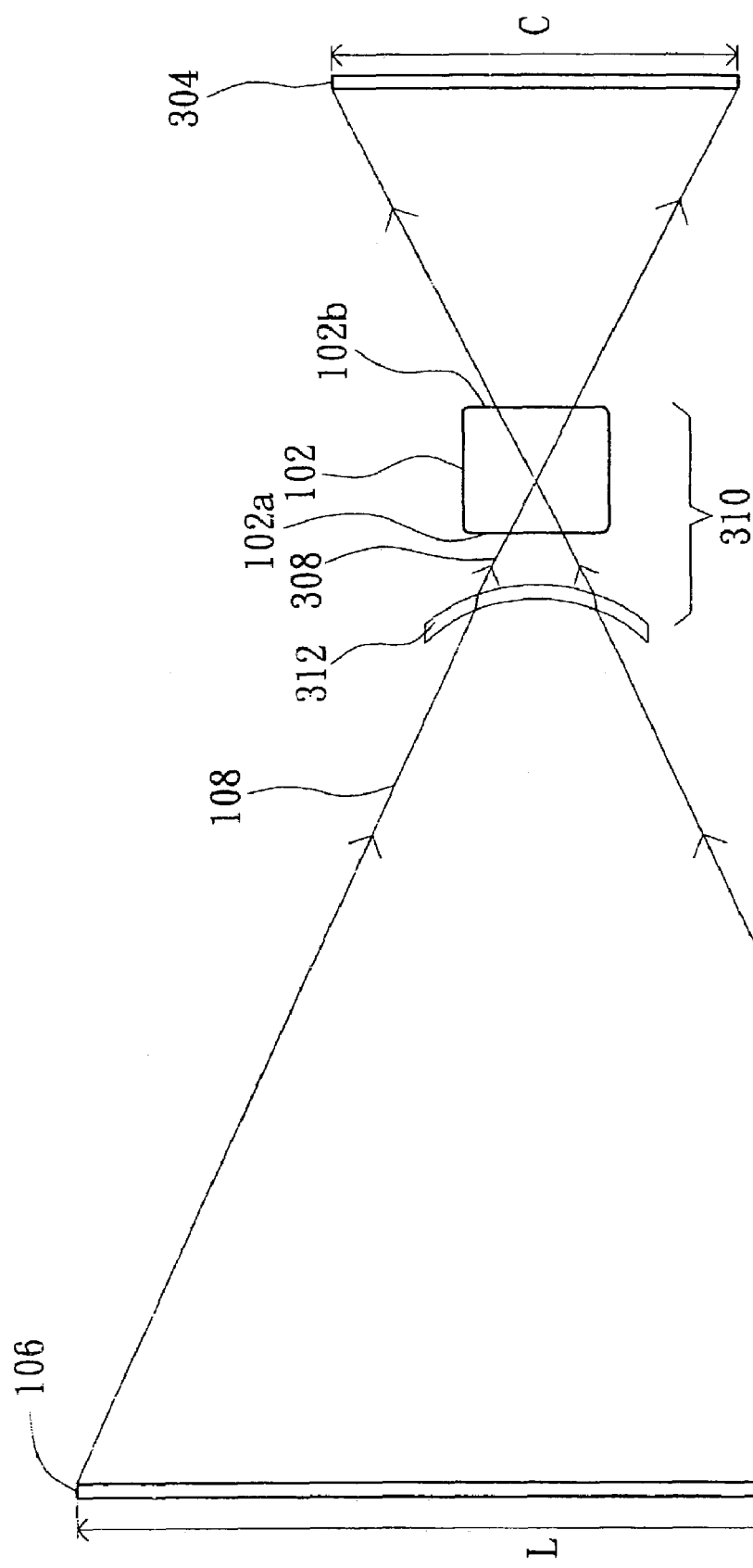
FIG. 3 is a drawing schematically illustrating an optical path among the document to be scanned, the primary lens, and the optical sensing device, according to a second preferred embodiment of the present invention.

Referring to FIG. 3, it is a drawing schematically illustrating an optical path among the document to be scanned, the primary lens, and the optical sensing device, according to a second preferred embodiment of the present invention. Referring to FIG. 1 and FIG. 3, when the optical sensing device 102 shown in FIG. 1 is replaced by the optical sensing device 304 with the larger size as shown in FIG. 3, the user can install the lens module 310 of the present invention, so as to collect and focus the scanning light beam 108 to form an image on the optical sensing device 304. The size of the optical sensing device 104 in FIG. 1 is A; the size of the optical sensing device 304 is C; and the quantity of C is greater than the quantity of A.

Therefore, the user can directly install a correction lens 312 at the location in front of the light collection end 102a of the primary lens 102, such as a divergent lens for diverging the light, so as to change the original optical path of the original scanning light beam 108 (as shown in FIG. 1). This allows the scanning light beam 108 passing through the correction lens 312 to have the light diverging effect and then a lens corrected light beam 308 is obtained. Then, the primary lens 102 will collect and focus the lens corrected light beam 308 to form an image onto the optical sensing device 304 after the image output end 102b of the primary lens 102. Next, the optical sensing device 304 captures the scanning image of the document to be scanned 106. Also, the size of the scanning image matches the size of the optical sensing device 304.

Assuming the size of the scanning image captured by the optical sensing device 304 is C, then the magnification of the lens module 310 is C/L. Since the quantity of C is greater than the quantity of A, the quantity of C/L is also greater than the quantity A/L, i.e. the magnification of the lens module 310 is greater than the magnification of the primary lens 102.

Therefore, when the user wants to change to an optical sensing device of larger size, the user can directly install a correction lens with the effect of diverging the light beam, i.e. a divergent lens located in front of the light collection end of the original primary lens or between the image output end of the original primary lens and the optical sensing device. In this manner, the present invention can achieve the objective of matching the size of the scanned image captured by the optical sensing device to the size of the optical sensing device.

The method of installing the correction lens inside the scanner can vary. For example, the correction lens can be implemented by installing a buckling connection device at a location in front of the primary lens or between the primary lens and the optical sensing device. Here, an embodiment is again provided for descriptions of the features in present invention about the lens module 210.

Figure 5:
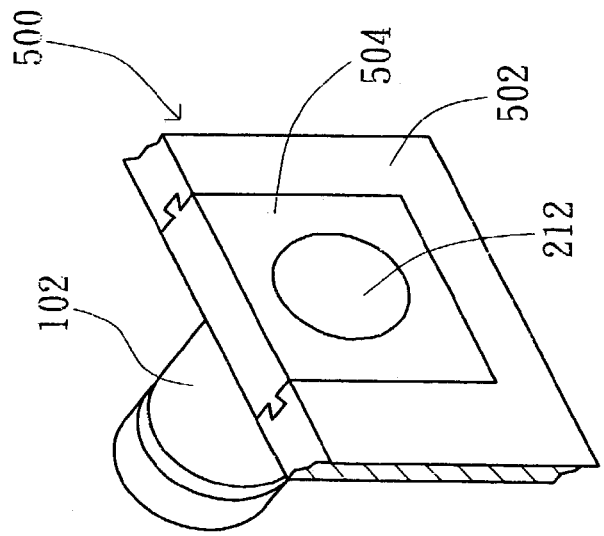
FIG. 5 is a drawing of a perspective view, schematically illustrating the correction lens and the buckling connection device of the primary lens as shown in FIG. 2 after assembly.
Figure 4:
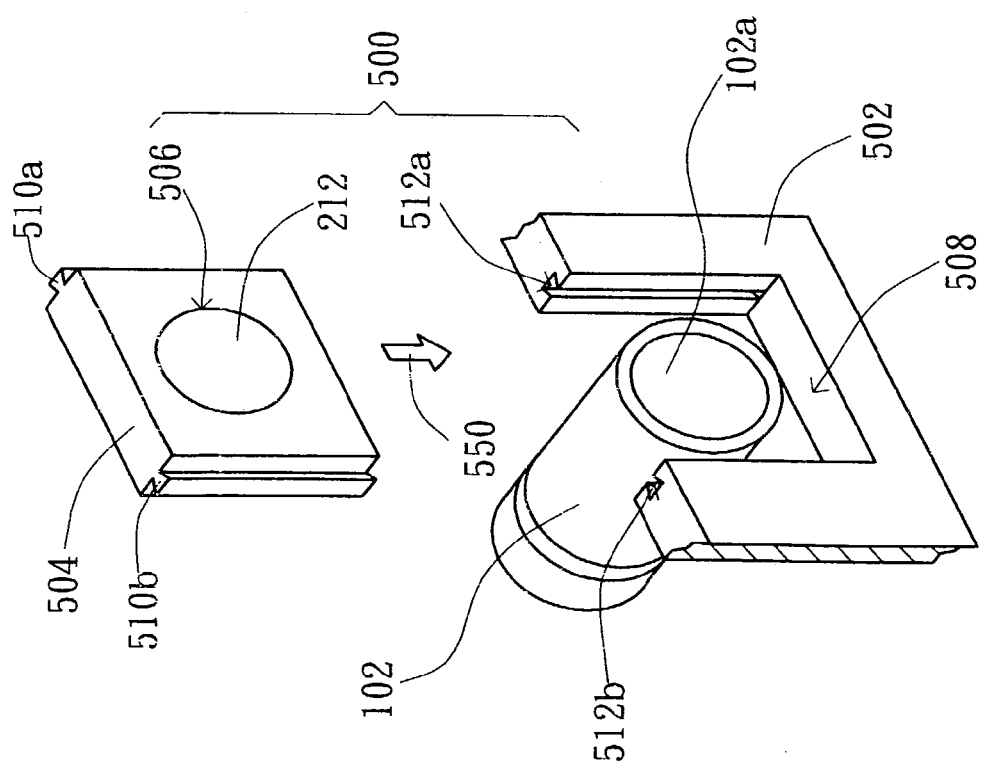
FIG. 4 is a drawing of an exploded view, schematically illustrating the correction lens and the buckling connection device of the primary lens as shown in FIG. 2.

Referring to FIGS. 4 and 5, which respectively illustrate the exploding view and the perspective view after assembly of the correction lens and the buckling connection device shown in FIG. 2. In FIG. 4, the buckling connection device 500 is located at a position in front of the light collection end 102a of the primary lens 102, and includes the base part 502 and the wedge carrier 504. The base part 502 has a concave region 508, so as to adapt the wedge carrier 504. Each of the two opposite walls of the concave region 508 has a sliding rail 512a or 512b, wherein the wedge carrier 504 has a buckling hole 506, used for allowing the correction lens 212 (or the correction lens 312) to be installed inside. Each of the two sides of the wedge carrier 504 has a sliding axis 510a or 510b, which is used to buckle with the sliding rail 512a or 512b respectively. As a result, the wedge carrier 504 can be implemented in the concave region 508 of the base part 502 by the buckling manner.

When the user installs the wedge carrier 504, which has carried the correction lens 212, onto the base part 502 along the direction indicated by the arrow 550, the sliding axes 510a and 510b of the wedge carrier 504 will be buckled in connection with the sliding rails 512a and 512b of the base part 502, as shown in FIG. 5. It is noted that the buckling connection device 500 can also be implemented at a position between the primary lens and the optical sensing device. In this manner, the design of the buckling connection is helpful to the user in changing the correction lens. In addition, it can even save the time needed for changing the lens.

However, the person skilled in the art should understand that the technology of the present invention is not restricted to the embodiments described above. For example, the foregoing buckling connection device can be applied to any buckling connection device of the scanner for the user to change the correction lens. In addition, the optical sensing device can be a charge coupled device (CCD) and another device capable of capturing the image.

In the foregoing embodiments of the present invention, a lens module with adjustable magnification has been disclosed. The user can select the corresponding correction lens to match with the different size of the various optical sensing devices. This allows the lens module of the present invention to focus and form an image with the size matching to the size of the optical sensing device, such as the total length of the effective pixels, so that the image can be captured by the optical sensing device. Thus, the present invention can allow the single primary lens to adapt to optical sensing devices of various sizes, and the labor of developing a new set of lens is unnecessary. Furthermore, the present invention can also save research resource and reduce fabrication cost.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A lens module comprising:
    a correction lens configured to converge or diverge a scanning light beam to create a converged or diverged light beam;
    a primary lens configured to collect the converged or diverged light beam from the correction lens, and to focus the converged or diverged light beam to form a scanning image onto an optical sensing device, wherein the scanning image has a size that corresponds to a size of the optical sensing device; and
    a connection device including a carrier configured to hold the correction lens, and including a base configured to detachably couple with the carrier and install the correction lens in front of a light collection end of the primary lens.

2. The lens module of claim 1, wherein the correction lens is a divergent lens capable of diverging the scanning light beam, such that a magnification of the lens module is greater than a magnification of the primary lens.

3. The lens module of claim 1, wherein the lens module is installed in a scanner, the scanner comprising:
    a light source configured to illuminate a document to be scanned, and configured to produce the scanning light beam.

4. The lens module of claim 1, wherein the optical sensing device includes a charge coupled device (CCD).

5. The lens module of claim 1, wherein the base includes a concave region having at least one sliding rail, and the carrier includes a buckling hole configured to hold the correction lens, wherein the carrier includes at least one sliding axis configured to detachably couple with the at least one sliding rail, so that the carrier is installed in the concave region of the base.

6. A scanner comprising:
    a optical sensing device configured to capture an image with a size corresponding to a size of the optical sensing device; and
    a lens module, wherein the lens module comprises:
        at least one correction lens configured to converge or diverge a scanning light beam to create a converged or diverged light beam from the scanning light beam;
        a primary lens configured to collect and focus the converged or diverged light beam to form the image onto the optical sensing device, wherein the size of the image corresponds to the size of the optical sensing device; and
        a connection device including a carrier configured to hold the correction lens, and including a base configured to detachably couple with the carrier and install the correction lens in front of a light collection end of the primary lens.

7. The scanner of claim 6, further comprising:
    a light source to illuminate a document to be scanned, and to produce the scanning light beam.

8. The scanner of claim 6, wherein the correction lens is a divergent lens capable of diverging the scanning light beam, such that a magnification of the lens module is greater than a magnification of the primary lens.

9. The scanner of claim 6, wherein the optical sensing device includes a charge coupled device (CCD).

10. The scanner of claim 6, wherein the base includes a concave region having at least one sliding rail, and the carrier includes a buckling hole configured to hold the correction lens, wherein the carrier includes at least one sliding axis configured to detachably couple with the at least one sliding rail, so that the carrier is installed in the concave region of the base.

11. A lens module comprising:
  means for receiving a scanning light beam and for converging or diverging a light beam;
  means for collecting and focusing the light beam to form a scanning image onto an optical sensing device, wherein the scanning image has a size that corresponds to a size of the optical sensing device;
  means for holding the means for receiving the scanning light beam; and
  means for detachably coupling the means for holding to a base, which is configured to install the means for receiving the scanning light beam in front of a light collection end of the means for collecting and focusing the light beam.

12. The lens module of claim 11, wherein the base includes a concave region having at least one sliding rail, and wherein the means for detachably coupling is configured to detachably couple with the at least one sliding rail, so that the means for holding is installed in the concave region of the base.

13. A scanner comprising:
  means for receiving a scanning light beam and for converging or diverging a light beam;
  means for collecting and focusing the light beam to form a scanning image onto an optical sensing device, wherein the scanning image has a size that corresponds to a size of the optical sensing device;
  means for capturing the scanning image;
  means for holding the means for receiving the scanning light beam; and
  means for detachably coupling the means for holding to a base, which is configured to install the means for receiving the scanning light beam in front of a light collection end of the means for collecting and focusing the light beam.

14. The scanner of claim 13, wherein the base includes a concave region having at least one sliding rail, and wherein the means for detachably coupling is configured to detachably couple with the at least one sliding rail, so that the means for holding is installed in the concave region of the base.

15. A method comprising:
  receiving a scanning light beam and converging or diverging a light beam with a correction lens;
  collecting and focusing the light beam with a primary lens to form a scanning image onto an optical sensing device, wherein the scanning image has a size that corresponds to a size of the optical sensing device;
  holding the correction lens with a carrier; and
  detachably coupling with the carrier to a base, which is configured to install the correction lens in front of a light collection end of the primary lens the light beam.

16. The method of claim 15, wherein the base includes a concave region having at least one sliding rail, and the carrier includes a buckling hole configured to hold the correction lens, wherein the carrier includes at least one sliding axis configured to detachably couple with the at least one sliding rail, so that the carrier is installed in the concave region of the base.

17. A method comprising:
  capturing a scanning image;
  receiving a scanning light beam and converging or diverging a light beam with a correction lens;
  collecting and focusing the light beam with a primary lens to form the scanning image onto the optical sensing device, wherein the scanning image has a size that corresponds to a size of the optical sensing device;
  holding the correction lens with a carrier; and
  detachably coupling with the carrier to a base, which is configured to install the correction lens in front of a light collection end of the primary lens the light beam.

18. The method of claim 17, wherein the base includes a concave region having at least one sliding rail, and the carrier includes a buckling hole configured to hold the correction lens, wherein the carrier includes at least one sliding axis configured to detachably couple with the at least one sliding rail, so that the carrier is installed in the concave region of the base.

* * * * *